United States Patent Office 3,063,160
Patented Nov. 13, 1962

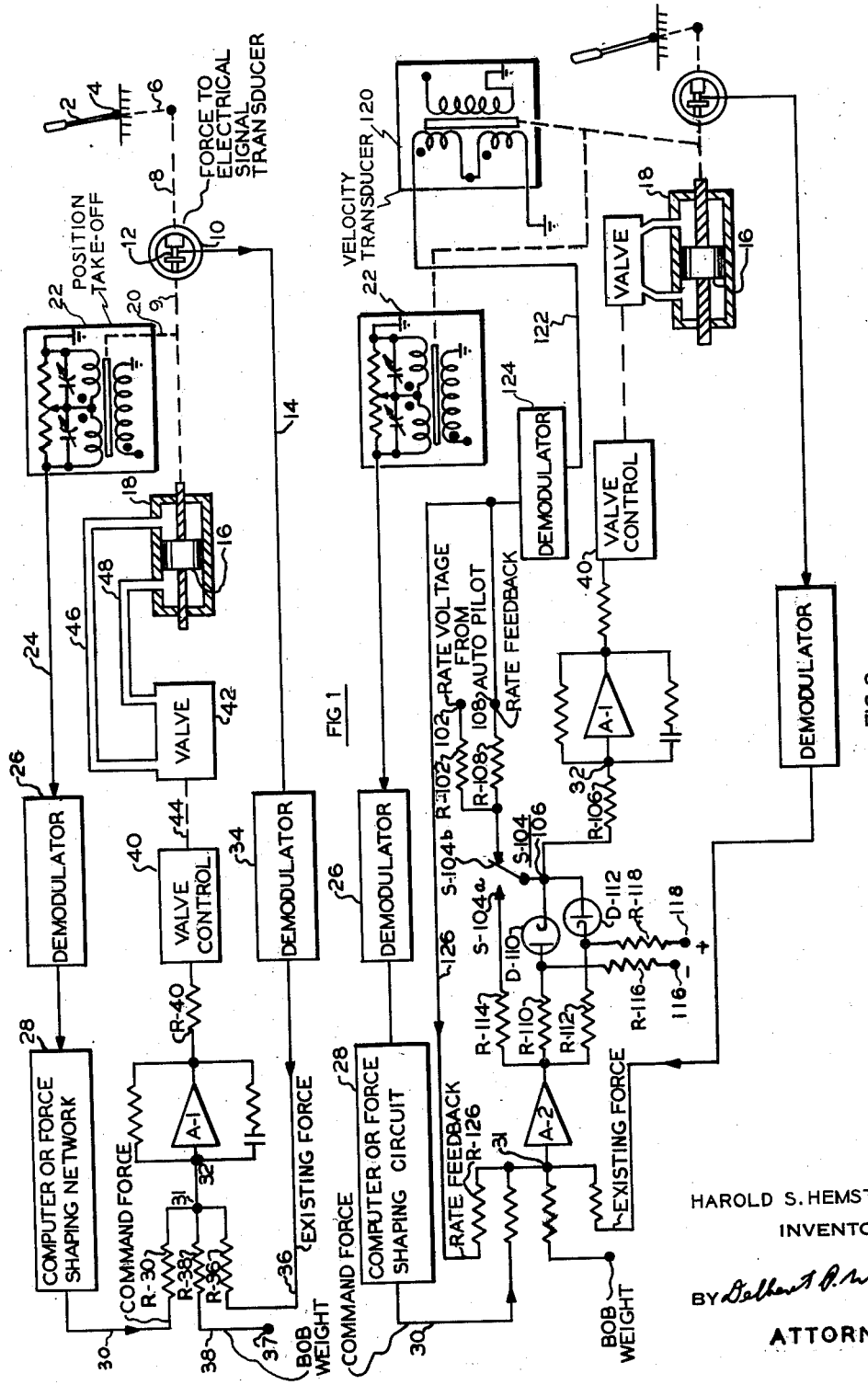

3,063,160
SYSTEM FOR SIMULATING THE EFFECTS OF AUTO-PILOT INPUTS TO THE CONTROL COLUMN OF AN AIRCRAFT
Harold S. Hemstreet, Binghamton, N.Y., assignor to General Precision Inc., a corporation of Delaware
Filed Jan. 19, 1959, Ser. No. 787,760
9 Claims. (Cl. 35—12)

The present invention relates to means for simulating the effects of auto-pilot inputs on the control column of an aircraft, and more particularly relates to the effects of such an input on a hydraulic control loading device designed to simulate the forces acting on the controls of an aircraft.

Among the prior art devices to be found in the aircraft simulator art are devices for simulating force reactions to the pilot's movements of various control elements associated with the control column. An invention designed to simulate such force reactions is set forth in considerable detail in the copending United States application of Harold S. Hemstreet, et al., Serial No. 620,851, entitled "Force Simulation" which was issued as United States Patent No. 3,007,258 on November 7, 1961. This prior art device does not expressly provide for the simulation of the effects of an auto-pilot and no other devices are known which provide for such simulation.

In an aircraft, an auto-pilot generates a rate signal which is sent to a motor directly connected to the control column (one motor for each axis) through a friction clutch. This motor, therefore, acts like a velocity servo and displaces the control column at a rate proportional to the input signal to the motor. The maximum force which the motor can exert on the column is limited by the friction clutch and the friction torque limit may be adjusted to different discrete values depending upon airspeed and certain other parameters.

It is possible, in a simulator, to simulate the action of an auto-pilot by utilizing the same motors that are used in an aircraft and arranging these motors to drive directly against a universal hydraulic control loading unit. However, it is desirable to seek means for avoiding this type of construction, since the motors and their associated controls are expensive and because of the limited spaced available in the trainer configuration design. If the motors from the auto-pilot itself are used to drive the control loading unit, then as these motors operate to displace the control from its neutral position forces are produced which are analogous to those which occur in an aircraft when the motors drive the control column away from the neutral position.

It is a primary object, therefore, of this invention to provide means for supplying an input to a hydraulic control loading device which represents the forces produced by an aircraft auto-pilot.

It is a further object of this invention to provide means for simulating auto-pilot inputs to an aircraft control column.

It is another object of this invention to provide means for simulating the action of a friction clutch such as that employed to interconnect an auto-pilot and an aircraft control column.

It is yet another object of this invention to simulate the slippage of a friction clutch and thereby to represent the overpowering of an auto-pilot.

The foregoing objects and others ancillary thereto I prefer to accomplish as follows:

According to a preferred embodiment of my invention a voltage representing a rate voltage from an auto-pilot, or an actual rate voltage from an auto-pilot, is provided to the input terminal of a servo amplifier used to operate the valve control of a hydraulic control loading system such as that in patent application No. 620,851 (Patent No. 3,007,258) to which reference was previously made. Additional voltages representing the existing force, the command force, the bob weight, and the damping force which are normally supplied to the valve control of the hydraulic control loading device are provided as inputs to an amplifier, the output terminal of which is fed to two biased diodes of opposite polarity. The diodes are biased in such a manner that they prevent the transmission of the output signal from the amplifier to the valve control until voltages representing the slipping rate on the mechanical clutch are exceeded, at which time said voltages will exceed the rate voltages from the auto-pilot and supersede the auto-pilot as the source of the control voltages for the hydraulic system.

The novel features that I consider characteristic of my invention are set forth with particularity in the appended claims. The invention itself, however, both as to its organization and its method of operation together with additional objects and advantages thereof, will best be understood from the following description of a specific embodiment when read in connection with the accompanying drawings, in which:

FIG. 1 is a diagram partially in block form, partially in the form of an electrical schematic and partially in the form of symbols representing mechanical linkages which illustrates a prior art device.

FIG. 2 is a diagram compounded of block diagrams, electrical schematics and symbols representing mechanical components which illustrates the application of the invention to the prior art control loading device.

For a detail description of the prior art control loading device reference should be made to copending application No. 620,851 referred to above. A brief description of this invention may be made with reference to FIG. 1 however, in which the arm 2 represents the control stick or other control element subject to operation by a student pilot. The arm 2 is pivoted at point 4 from which it is mechanically linkaged through linkages 6 and 8 to a proving ring or a force ring at 10. The force ring contains a differential transformer at 12 (similar to that shown as 22 in the figures) which, under conditions of very slight displacement of its elements due to slight deformation of the force ring when the linkages 8 and 9 are subjected to axial forces, produces an electrical signal representing the existing force between arm 2 and a piston 16 which is transmitted through line 14. The shaft 9 connects the force ring 10 to the piston 16 in a hydraulic cylinder 18, and connects through a shaft 20 to a differential transformer contained in a position take-off device 22 or position to voltage transducer 22.

The output from the position to voltage transducer 22 is applied through a transmission line 24 to a demodulator 26 and then through a portion of a flight simulating computer or force shaping network 28 to provide a voltage proportional to the forces on the aircraft control surfaces as determined in the computer 28. This signal may be called the command force and is applied through line 30 to a resistor R–30, to the terminal 31 and to the input terminal 32 of an operational amplifier A–1.

A voltage representing the exsiting force between the loading piston 16 and the arm 2 is fed from line 14 through a demodulator 34, through a line 36, through a resistor R–36 and through the terminal 31 to the input terminal 32 of the amplifier A–1. A voltage proportional to a bob weight force may be supplied from a terminal 37 through a line 38 and through a resistor R–38 to the input terminal 32 of amplifier A–1. The output terminal of amplifier A–1 is connected through a resistor R–40 to a valve control 40 for controlling the rate of flow of fluid under pressure from a hydraulic pressure supply (not illustrated) through mechanical linkage 44, valve 42 and hydraulic linkages 46 and 48 into the hydraulic cylinder 18 to control the position of piston 16 and the force that can be exerted by piston 16 on the linkage 9 when force is applied on arm 2.

The foregoing feedback circuits provide means for simulating the feel of aircraft controls while at the same time providing means by which those controls may be effectively used for training purposes as in a computer at 28. It will be recognized that any force applied on the stick 2 will be met by a counter force on the piston 16 in the hydraulic cylinder 18 due directly to the hydraulic fluid under control of the valve control 40 and less directly to the other elements of the circuits, since these other elements provide the control voltage for the valve control 40. Any force, however slight, brought to bear on the control stick 2 will produce a voltage from the different transformer in force ring 10 which will be fed into the valve control 40 to actuate the piston 16. Any slight change in the position of the stick will be translated via mechanical linkages 6, 8, 9 and 20 through the piston sensing device at 22 which will provide an output voltage via line 24, demodulator 26, the computer or force shaping network 28, resistor R–30, amplifier A–1 and resistor R–40, to the valve control 40 to provide an opposing force through the piston 16 and therefore through the mechanical linkages to stick 2. It is apparent, therefore, that any force applied to stick 2, as by a student pilot, from outside the system of FIG. 1, will produce forces in the hydraulic cylinder and in the mechanical linkages to oppose such externally applied forces, and it is apparent that this opposing force may be modified by modifying the characteristics of the elements illustrated in FIG. 1, such as by modification of the computing elements indicated by block diagram 28 or by the introduction of additional elements as set out below.

Turning now to the embodiment of the invention illustrated in FIG. 2, it will be noted that a number of the elements in FIG. 1 are repeated and that where this has been done the same numbering system has been followed where necessary to complete the explanation. It will be noted immediately that a plurality of additional elements have been inserted between the terminal 31 and the input terminal 32 of amplifier A–1. A rate voltage from an automatic pilot or auto-pilot or a voltage simulating such a rate voltage is applied at a terminal 102 through a resistor R–102 and through the contact S–104b of switch S–104 to a terminal 106 which is connected by way of a resistor R–106 to the input terminal 32 of amplifier A–1. A voltage labelled "rate feedback," which will be discussed hereinafter, is applied on terminal 108 and by way of resistor R–108 and switch contact S–104b to terminal 106. The rate voltage on terminal 102 will generally be available, when switch contact S–104b is closed, to tend to control the position of the piston 16 in the hydraulic cylinder 18 and thus to position or apply force to the stick 2 or other aircraft control elements, in accordance with signals from the auto-pilot.

It will be recalled from the discussion above that the auto-pilot in an actual aircraft is connected to the control column by means of a mechanical clutch, which may, of course, slip under various conditions of load on the control surfaces of the aircraft or if excessive force is applied to the control levers such as 2. In order to effectively simulate the conditions of slippage when the switch S–104b is closed and the auto-pilot is operating, amplifier A–2, resistors R–110 and R–112 and diodes D–110 and D–112 have been inserted in the circuit before terminal 32 of amplifier A–1. An additional resistor R–114 has also been inserted to provide a direct path for the output voltages of amplifier A–2 through switch contact S–104a and through switch S–104 to amplifier A–1 when the auto-pilot is turned off.

Diode D–110 has a negative bias applied to its plate circuit from a terminal 116 through a resistor R–116, and diode D–112 has a positive bias applied to its cathode circuit from a terminal 118 through a resistor R–118; whereby said diodes operate as voltage limiters to prevent the output voltage from amplifier A–2 from reaching terminal 106 (when S–104a is open and S–104b is closed) except when the voltage applied to either resistor R–110 or resistor R–112 is great enough to overcome the bias on the corresponding diode. The biases applied to terminals 116 and 118 are selected to be of a magnitude corresponding to the mechanical force (or slip torque) necessary to cause slippage of the mechanical clutches which connect an actual auto-pilot to an actual aircraft.

Continuing with the description and explanation of FIG. 2, as the rate signal or rate voltage from terminal 102 causes the position of the control column and of the hydraulic piston to change, a position voltage is developed in the position take-off element or position to electrical signal transducer 22 which is transmitted back through the demodulator 26 and through the computer networks 28 to provide a voltage which represents the command force. If the pilot exerts no forces on the control column there will be no "existing force," and this command force will represent the force which the friction clutch will see (neglecting rate feedback and bob weight force). If the command force, or the sum of the voltages input into amplifier A–2, becomes large enough so that the output voltage from the amplifier A–2, exceeds the bias limit of the diodes D–110 and D–112, then this voltage will be transmitted to the valve control 40 to control the motion of the piston. A voltage which exceeds the bias on tubes D–110 and D–112 represents a force great enough to cause slippage between the friction clutch of the simulated auto-pilot and the control column of the simulated airplane. Such a force may be represented by the command force and/or the existing force.

In an aircraft it is possible for the pilot to exert a force on the control column, while the auto-pilot is operating, of sufficient magnitude to overcome both the friction clutch on the motor and the forces developed by the control surfaces of the airplane. He can then displace the control column. Such action by the pilot is simulated in part in the circuit of FIG. 2 by the signal labeled "existing force" from the force ring which is supplied to the input terminal of amplifier A–2. The only force seen by the force ring is that exerted by the student pilot himself and it will be noted that the summation of the command force and the existing force by amplifier A–2 results in an output from amplifier A–2 which may be less than, may equal or may exceed the bias on the diodes representing the limit of the force or torque which may be imposed on the simulated friction clutches. If this output from amplifier A–2 exceeds the bias on the diodes, slippage of the clutches will be simulated; if it does not, no slippage will be simulated. This is true whether or not the pilot is exerting a force on the control column and consequently the diodes continue to simulate the friction limit of the clutches whether or not the pilot imposes an additional force.

A rate signal from a velocity transducer 120 provides a correction for drift due to leakage in the hydraulic system. This transducer is essentially a coil having a movable permanent magnet core which is designed to provide a signal representing rate of change of distance or velocity. The output of velocity transducer 120 is provided through line 122 to demodulator 124 from which it is applied to terminal 108 and by way of line 126 and resistor R–126 to the input terminal of the amplifier A–2.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In an aircraft simulator means for simulating the effects of an auto-pilot on a control loading device comprising a first summing amplifier, means for providing a first voltage representative of a desired control loading force, means for providing a second voltage representative of the force existing between the control column and the control loading device, means connecting said first voltage and said second voltage to said first amplifier, a second summing amplifier, means for providing a rate voltage representative of a control signal from an auto-pilot, means for connecting said rate voltage to said second amplifier, biasing means including a pair of oppositely biased diodes connected in a parallel circuit, means coupling said biasing means between an output terminal of said first amplifier and an input terminal of said second amplifier, said biasing means providing a bias between certain maxima and minima to restrict the transmission of the output voltage from said first amplifier to said second amplifier to values at least equal to those representing forces causing slippage between a mechanism mechanically linking said auto-pilot and said control loading device, switching means coupled to said input terminal of said second amplifier for connecting said rate voltage to said second amplifier and for disconnecting said rate voltage from said second amplifier, said switching means including means for connecting the output voltage of said first amplifier through a resistor to said second amplifier at substantially the same time said switching means disconnects said rate voltage from said second input terminal, and means responsive to the output of said second amplifier to control the operation of said control loading device.

2. In an aircraft simulator means for simulating the effects of an auto-pilot on a control loading device comprising a first summing amplifier including a first input terminal and a first output terminal, means connected to said first input terminal for providing a first voltage representative of a desired control loading force, means connected to said first input terminal for providing a second voltage representative of the existing force between said control loading device and the simulated control column, a second summing amplifier including a second input terminal and a second output terminal, means coupled to said second input terminal for providing a rate voltage representative of a control signal from an auto-pilot biasing means connected between said first output terminal and said second input terminal, said biasing means providing a bias between selected maxima and minima to restrict the transmission of the output voltage from said first amplifier to said second amplifier to values at least equal to those representing forces causing slippage between a mechanism mechanically linking said auto-pilot and said control loading device, and means responsive to the output of said second amplifier to control the operation of said control loading device.

3. In an aircraft simulator means for simulating the effects of an auto-pilot on a control loading device comprising a first summing amplifier coupled to a first input terminal and a first output terminal, means connected to said first input terminal for providing a first voltage representative of a desired control loading force, means connected to said first input terminal for providing a second voltage representative of the existing force between said control loading device and the simulated control column, a second summing amplifier coupled to a second input terminal and a second output terminal, means coupled to said second input terminal for providing a rate voltage representative of a control signal from an auto-pilot, biasing means including a pair of diodes biased in opposite directions and connected in a parallel circuit between said first output terminal and said second input terminal, said biasing means providing a bias between predetermined maxima and minima to restrict the transmission of the output voltage from said first amplifier to said second amplifier to values at least equal to those representing forces causing slippage between a mechanism mechanically linking said auto-pilot and said control loading device, and means responsive to the output of said second amplifier to control the operation of said control loading device.

4. In an aircraft simulator means for simulating the effects of an auto-pilot on a control loading device comprising a first summing amplifier coupled to a first input terminal and a first output terminal, means connected to said first input terminal for providing a first voltage representative of a desired control loading force, means coupled to said first input terminal for providing a second voltage representative of the force existing between the control column and the control loading device and means connected to said first input terminal for receiving a third voltage representative of the force due to bob weight, a second summing amplifier coupled to a second input terminal and a second output terminal, means coupled to said second input terminal for providing a rate voltage representative of a control signal from an auto-pilot, biasing means including a pair of oppositely biased diodes connected in a parallel circuit between said first output terminal and said second input terminal, said biasing means providing a bias between selected maxima and minima to restrict the transmission of the voltage output of said first amplifier to said second amplifier to values at least equal to those representing forces causing slippage between a mechanism mechanically linking an auto-pilot and a control loading device, and means responsive to the output of said second amplifier to control the operation of said control loading device.

5. In an aircraft simulator means for simulating the effects of an auto-pilot on a control loading device comprising a first summing amplifier coupled to a first input terminal and a first output terminal, means connected to said first input terminal for providing a first voltage representative of a desired control loading force, means connected to said first input terminal for providing a second voltage representative of the existing force between said control loading device and the simulated control column, a second summing amplifier coupled to a second input terminal and a second output terminal, means coupled to said second input terminal for providing a rate voltage representative of a control signal from an auto-pilot, biasing means including a pair of diodes connected in a parallel circuit between said first output terminal and said second input terminal, said biasing means providing a bias between preselected maxima and minima to restrict the transmission of the output voltage from said first amplifier to said second amplifier to values at least equal to those representing forces causing slippage between a mechanism mechanically linking an auto-pilot and a control loading device, and switching means coupled to said second input terminal for connecting said rate voltage to said second input terminal and for disconnecting said rate voltage from said second input terminal, said switching means including means for connecting the output voltage of said first amplifier through a resistor to said second input terminal at substantially the same time said switching means disconnects said rate voltage from said second input terminal, and means for connecting said second output terminal to control means for the control loading device.

6. In an aircraft simulator means for simulating the effects of an auto-pilot on a control loading device comprising a first summing amplifier coupled to a first input terminal and a first output terminal, means connected to said first input terminal for providing a first voltage representative of a desired control loading force, means coupled to said first input terminal for providing a second voltage representative of the force existing between the control column and the control loading device and means connected to said first input terminal for providing a third voltage representative of the force due to bob weight, a second summing amplifier coupled to a second input terminal and a second output terminal, means coupled to said second input terminal for providing a rate voltage representative of a control signal from an auto-pilot, biasing means including a pair of diodes connected in a parallel circuit between said first output terminal and said second input terminal, said biasing means providing a bias between selected maxima and minima to restrict the transmission of an output voltage from said first amplifier to said second amplifier to values at least equal to those representing forces causing slippage between a mechanism mechanically linking an auto-pilot and a control loading device, switching means coupled to said second input terminal for connecting said rate voltage to said second input terminal and for disconnecting said rate voltage from said second input terminal, said switching means including means for connecting the output voltage of said first amplifier through a resistor to said second input terminal at substantially the same time said switching means disconnects said rate voltage from said second input terminal, and means for connecting said second output terminal to the control loading device.

7. In an aircraft simulator means for simulating the effects of an auto-pilot on a control loading device comprising a first summing amplifier coupled to a first input terminal and a first output terminal, means connected to said first input terminal for providing a first voltage representative of a desired control loading force, means coupled to said first input terminal for providing a second voltage representative of the force existing between the control column and the control loading device and means connected to said first input terminal for providing a third voltage representative of the force due to bob weight, a second summing amplifier coupled to a second input terminal and a second output terminal, means coupled to said second input terminal for providing a rate voltage representative of a control signal from an auto-pilot, biasing means including a pair of diodes connected in a parallel circuit between said first output terminal and said second input terminal, said biasing means providing a bias between preselected maxima and minima to restrict the transmission of the output voltage of said first amplifier to values at least equal to those representing forces causing slippage between a mechanism mechanically linking an auto-pilot and a control loading device, and switching means coupled to said second input terminal for connecting said rate voltage to said second input terminal and for disconnecting said rate voltage from said second input terminal, said switching means including means for connecting the output voltage of said first amplifier through a resistor to said second input terminal at substantially the same time said switching means disconnects said rate voltage from said second input terminal, and means for connecting said second output terminal to control means for the control loading device.

8. In an aircraft simulator means for simulating the effects of an auto-pilot on a control loading device comprising a first summing amplifier coupled to a first input terminal and a first output terminal, means connected to said first input terminal for providing a first voltage representative of a desired control loading force, means coupled to said first input terminal for providing a second voltage representative of the force existing between the control column and the control loading device and means connected to said first input terminal for providing a third voltage representative of the force due to bob weight, a second summing amplifier coupled to a second input terminal and a second output terminal, means connected to said second input terminal for providing a rate voltage representative of a control signal from an auto-pilot, biasing means including a pair of oppositely biased diodes connected in a parallel circuit between said first output terminal and said second input terminal, said biasing means providing a bias between selected maxima and minima to restrict the transmission of voltage between said first amplifier and said second amplifier to values at least equal to those representing forces causing slippage between a mechanism mechanically linking an auto-pilot and a control loading device, switching means coupled to said second input terminal for connecting said rate voltage to said second input terminal and for disconnecting said rate voltage from said second input terminal, said switching means including means for connecting the output voltage of said first amplifier through a resistor to said second input terminal at substantially the same time said switching means disconnects said rate voltage from said second input terminal, means for connecting said second output terminal to the control loading device, transducer means coupled to said control loading device for changing motion due to leakage in said control loading system to a rate feedback signal to supply a correction for drift caused by said leakage in said control loading device, and means for connecting said feedback signal to said second input terminal, said last named signal thereby providing stabilization to limit drift in said control device.

9. In an aircraft simulator means for simulating the effects of an auto-pilot on a control loading device comprising a first summing amplifier coupled to a first input terminal and a first output terminal, means connected to said first input terminal for providing a first voltage representative of a desired control loading force, means coupled to said first input terminal for providing a second voltage representative of the force existing between the control column and the control loading device and means connected to said first input terminal for providing a third voltage representative of the force due to bob weight, a second summing amplifier coupled to a second input terminal and a second output terminal, means connected to said second input terminal for providing a rate voltage representative of a control signal from an auto-pilot, biasing means including a pair of oppositely biased diodes connected in a parallel circuit between said first output terminal and said second input terminal, said biasing means providing a bias between selected maxima and minima to restrict the transmission of voltage between said first amplifier and said second amplifier to values at least equal to those representing forces causing slippage between a mechanism mechanically linking an auto-pilot and the controls of an aircraft, switching means coupled to said second input terminal for connecting said rate voltage to said second input terminal and for disconnecting said rate voltage from said second input terminal, said switching means including means for connecting the output voltage of said first amplifier through a resistor to said second input terminal at substantially the same time said switching means disconnects said rate voltage from said second input terminal, transducer means connected between said control loading device and said second input terminal means for transmitting a signal representing the rate at which said control loading device is moving, said last named signal thereby increasing the loop gain of the system to swamp out the effects of drift and leakage in said control loading device, and means for connecting said second output terminal to the control loading device.

References Cited in the file of this patent

UNITED STATES PATENTS

| | | |
|---|---|---|
| 2,597,789 | McGoldrick | May 20, 1952 |
| 2,620,463 | Meredith | Dec. 2, 1952 |
| 2,673,314 | MacCallum | Mar. 23, 1954 |
| 2,804,698 | Grandmont | Sept. 3, 1957 |
| 2,808,659 | Dehmel | Oct. 8, 1957 |
| 2,827,789 | Oplinger | Mar. 25, 1958 |
| 2,833,496 | McKuer | May 6, 1958 |
| 2,834,929 | Ciscel | May 13, 1958 |
| 2,851,795 | Sherman | Sept. 16, 1958 |
| 2,859,926 | Westbury | Nov. 11, 1958 |
| 2,860,423 | Dehmel | Nov. 18, 1958 |
| 2,861,756 | Feucht | Nov. 25, 1958 |
| 2,873,418 | Owen | Feb. 10, 1959 |